United States Patent [19]

Zurcher

[11] Patent Number: 4,875,639
[45] Date of Patent: Oct. 24, 1989

[54] DEPTH SETTING DEVICE FOR A SPINNING REEL

[75] Inventor: John A. Zurcher, Tulsa, Okla.
[73] Assignee: Zebco Corporation, Tulsa, Okla.
[21] Appl. No.: 224,577
[22] Filed: Jul. 26, 1988
[51] Int. Cl.[4] ............................................. A01K 89/01
[52] U.S. Cl. ...................................... 242/309; 403/316
[58] Field of Search ...................... 242/84.1 L, 84.2 R; 403/316

[56] References Cited

U.S. PATENT DOCUMENTS

| | | | |
|---|---|---|---|
| 3,456,982 | 9/1969 | Coshow | 242/84.1 L |
| 3,563,489 | 2/1971 | Coshow | 242/84.1 L |
| 3,666,197 | 5/1972 | Coshow | 242/84.1 L |
| 3,730,455 | 5/1973 | Murphy | 242/84.1 L |
| 3,958,770 | 5/1976 | Murphy | 242/84.1 L |
| 4,614,314 | 9/1986 | Ban | 242/84.2 R |
| 4,778,123 | 10/1988 | Yoshikawa | 242/84.2 R |

Primary Examiner—Stuart S. Levy
Assistant Examiner—Katherine Matecki
Attorney, Agent, or Firm—Wood, Dalton, Phillips, Mason & Rowe

[57] ABSTRACT

A line-carrying spool assembly is provided for a fishing reel and consists of a spool having (a) a hub with a central axis and an annular surface around which line can be wound and (b) first and second flanges spaced axially with respect to the hub and extending radially outwardly from the annular hub surface so that the first and second flanges and hub surface cooperatively bound a line storage space, a line depth setting pin mounted to the spool for movement relative to the spool between (a) an operative position wherein the line depth setting pin extends through the line storage space between the first and second flanges radially outwardly of the annular hub surface and (b) a retracted position wherein substantially the entire line depth setting pin resides outside of the spool storage space, and structure for selectively maintaining the line depth setting pin in each of its operative and retracted positions.

12 Claims, 1 Drawing Sheet

DEPTH SETTING DEVICE FOR A SPINNING REEL

BACKGROUND OF THE INVENTION

1. Field of the Invention

This invention relates to fishing reels and, more particularly, to structure for consistently paying out a preselected length of line from a reel.

2. Background Art

Frequently, anglers will catch one fish in a school but be unable to return the bait to the same depth to attract the same school.

To obviate this problem, line memory structure has been incorporated into fishing reels to permit consistent payout of a preselected amount of line. Such structures commonly take the form of an elongate pin, which can be operatively situated to bridge spaced flanges on a line-carrying spool once a desired depth of line has been paid out. Retrieval of the line with the pin in operative position causes the retrieved line to wind against the pin. If the line is thereafter released, only that portion of the line wound against the pin will pay out so that the bait will be consistently returned to the desired depth. Exemplary prior art structures are shown in U.S. Pat. Nos. 3,730,455 and 3,958,770, both to Joseph C. Murphy.

It is also known to deflect the pin from its operative position with a predetermined tension applied to the line, as when the bait is snagged or a fish is hooked. Retraction of the pin permits the reel to be operated in normal fashion.

As a rule, the prior art line memory devices have been relatively complicated from a construction standpoint and in the case of spinning style reels, difficult to operate.

SUMMARY OF THE INVENTION

According to the invention, a line-carrying spool assembly is provided for a fishing reel and consists of a spool having (a) a hub with a central axis and an annular surface around which line can be wound and (b) first and second flanges spaced axially with respect to the hub and extending radially outwardly from the annular hub surface so that the first and second flanges and hub surface cooperatively bound a line storage space, a line depth setting pin mounted to the spool for movement relative to the spool between (a) an operative position wherein the line depth setting pin extends through the line storage space between the first and second flanges radially outwardly of the annular hub surface and (b) a retracted position wherein substantially the entire line depth setting pin resides outside of the spool storage space, and structure for selectively maintaining the line depth setting pin in each of its operative and retracted positions.

With the inventive structure, a self-contained spool assembly, incorporating the line depth setting pin, can be constructed. The spool assembly can be attached to a reel housing in the same manner as conventional spools without requiring any interconnection of the line depth setting structure and the remainder of the reel.

Another aspect of the invention is structure for selectively holding the line depth setting pin in each of its operative and retracted positions. In a preferred form, one of the spool flanges has a through bore to guide fore and aft axial movement of the line depth setting pin relative to the spool. The depth setting pin has a notch. With the depth setting pin in its operative position, a portion of the spool flange at the through bore nests in the pin notch to limit rearward axial shifting of the depth setting pin.

A coil spring is operative to both urge the pin radially inwardly, so that the flange seats in the notch, and bias the depth setting pin to its retracted position. Preferably, a coil spring surrounds the depth setting pin and is torsionally loaded so that the spring urges the pin radially inwardly and is compressed between the flange and a radially extending operating arm on the depth setting pin to urge the depth setting pin axially rearwardly relative to the spool.

With the above arrangement, upon all of the line wound around the depth setting pin being paid out, a predetermined tension on the line, caused typically by a hooked fish or with the line snagged, will cause the tensioned line to trip the portion of the pin within the line storage space radially outwardly so that the flange is no longer in the notch, at which point the compressed coil spring drives the pin to its retracted position.

It is another aspect of the invention to facilitate assembly of the line depth setting pin. A longitudinal slot is provided in a skirt extending rearwardly from the rearmost spool flange. The slot communicates with the through bore in the flange. The line depth setting pin is tilted and directed consecutively through the skirt slot, the coil spring, and then into the through bore, after which the trailing pin portion is tipped radially inwardly until the pin is properly located in the guide slot. A removable retainer clip is snap fit to the operating arm, which extends radially outwardly from the main body of the pin. The leading portion of the depth setting pin is tapered to facilitate its passage into the through bore with the pin tilted.

It is another aspect of the invention to provide a structure that is easily manipulated by a user. In a preferred form, the operating arm on the depth setting pin extends radially outwardly from the annular spool skirt. An enlarged head is provided on the operating arm and has a sufficiently low profile that it will pass radially beneath bail ears on a conventional bail arm associated with a spinning reel. The operating arm for the depth setting pin is accessible at all times that it resides between the bail ears.

A very compact structure results. There is no obtrusive structure on the reel required to operate the mechanism, yet at the same time the operating arm for the depth setting pin is readily accessible.

DETAILED DESCRIPTION OF THE DRAWINGS

Figure 1:
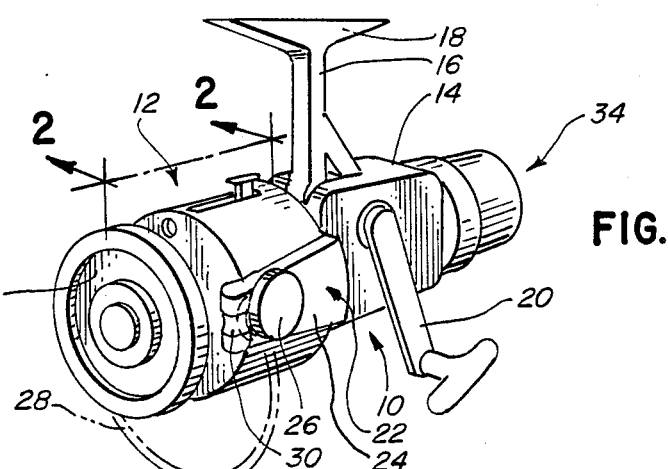
FIG. 1 is a perspective view of a spinning reel incorporating a spool assembly according to the present invention.
Figure 2:
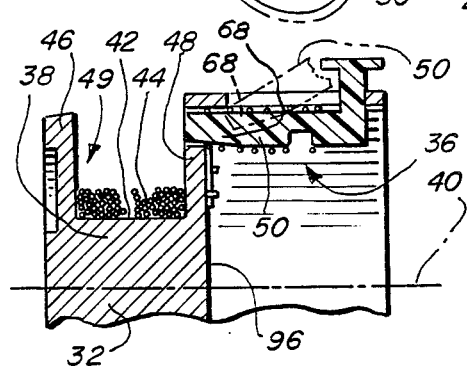
FIG. 2 is an enlarged, fragmentary, section view of the spool assembly taken along line 2—2 of FIG. 1, with a line depth setting pin on the spool assembly in a retracted position.
Figure 4:
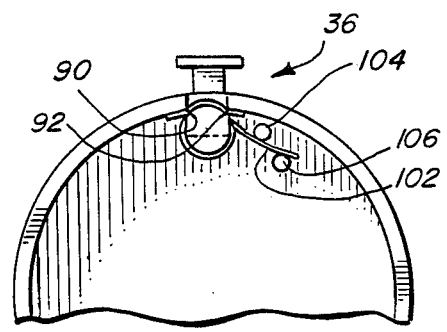
FIG. 4 is an enlarged, fragmentary, rear elevation view of the spool assembly.

A conventional spinning reel is shown at 10 in FIG. 1, having incorporated therein a preferred form of the inventive spool assembly at 12. The reel 10 consists of a housing 14 with an integral stem 16 carrying a mounting foot 18, which attaches to a fishing rod (not shown) in conventional fashion. The reel 10 has a crank handle 20 which is operable to rotate a bail assembly 22. The bail assembly 22 has diametrically opposite bail ears 24 (one shown) to which bail arms 26 are relatively rotatable about a common axis. The bail arms 26 cooperatively support a bail 28. Upon rotation of the bail assembly 22, a line guide 30 thereon winds line around a spool 32 on the spool assembly 12. A conventional drag adjusting structure at 34 is provided at the rear of the reel housing 14.

The details of the spool assembly 12 are shown clearly in FIGS. 2-5. The spool assembly 12 consists of the aforementioned spool 32 and line depth setting structure at 36 carried by and cooperating with the spool 32. The spool 32 consists of a hub 38 having a central axis 40 and an annular surface 42 about which a supply of line 44 is wound. Radially extending, front and rear flanges 46, 48, respectively, in conjunction with annular hub surface 42, cooperatively bound a line storage space 49. A supply of line is shown wound on the spool 32 in FIG. 2.

According to the invention, a line depth setting pin 50 is provided on the spool 32. The pin 50 has an elongate body 52 which is movable between a retracted position, shown in FIG. 2, and an operative position, shown in FIG. 3. In the retracted position of FIG. 2, the reel can be operated in conventional fashion.

Figure 3:
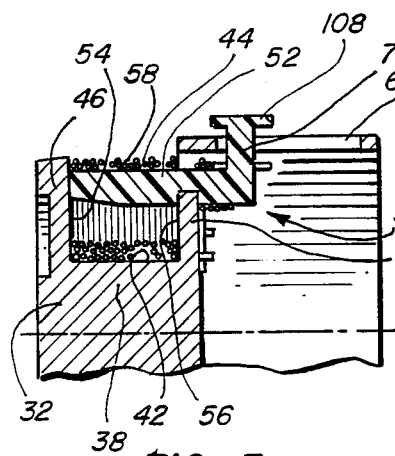
FIG. 3 is a view similar to that in FIG. 2 with the line depth setting pin in its operative position.
Figure 5:
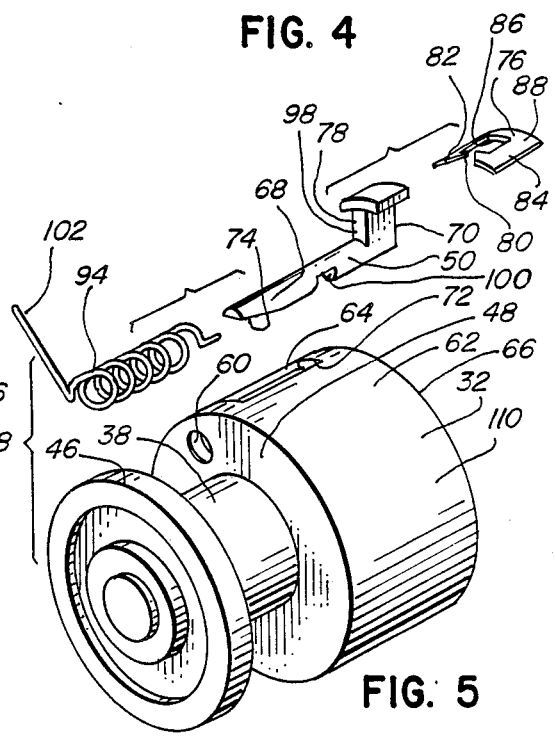
FIG. 5 is an enlarged, exploded, perspective view of the spool assembly.

With the pin 50 in its operative FIG. 3 position, the pin body 52 extends into the line storage space 49 and between axially facing surfaces 54, 56 on the front and rear flanges 46, 48, respectively. With the pin 50 in its operative position and the crank handle 20 rotated to retrieve line onto the spool 32, the line 44 is wrapped around the exposed surface 58 of the pin 50. To pay out the line to the same depth that it was at the point that the pin was moved from the FIG. 2 position to the FIG. 3 position, one need normally only release the bail 28 with the result that only the line wrapped around the pin 50 will pay out. Further paying out of line is blocked by the pin 50, which spans the flanges 46, 48 above the annular hub surface 42.

To mount the pin 50 for translatory movement in a fore and aft direction on the spool 32, a bore 60 is provided through the rear flange 48. The bore 60, which is substantially circular, is nominally matched to the cross section of the pin body 52.

The pin 50 is further guided relative to an annular skirt 62 that is integral with and extends rearwardly from the spool flange 48. The skirt 62 has an elongate slot 64 extending axially of the spool 32 and entirely enclosed by the wall 66 of the skirt 62. The length of the slot 64 is less than the overall length of the pin 50, and its width is slightly greater than the width of the pin 50.

The slot 64 is in communication with the bore 60 so that the pin 50 can be directed first through the slot 64 and then into the bore 60. To effect this assembly, the leading portion 68 of the pin 50 is directed through the slot 64 with the pin 50 tilted as shown in phantom in FIG. 2. The leading pin portion 68 will enter the bore 60 before the trailing end 70 of the pin 50 clears the rear edge 72 of the slot 64. Once the trailing pin end 70 does clear the slot edge 72, the trailing end 70 of the pin can be shifted radially inwardly and through the slot 64. The edge 72 limits rearward shifting of the pin upon its abutting the pin end 70. The leading pin portion 68 is tapered to define a ramp surface 74 which is guided against the flange surface surrounding the bore 60. This configuration permits the pin 50 to move into the bore 60 in its tilted orientation shown in phantom in FIG. 2.

Once the pin 50 is in place, a retainer clip 76 is snap-fit to an operating arm 78 on the pin, which arm 78 extends generally at right angles to the length of the pin body 52. The clip 76 is made from a curved piece of spring-type material and is generally U-shaped. There is a restricted opening 80 between the legs 82, 84 of the U. Upon the clip 76 being forced forwardly against the operating arm 78, the clip legs 82, 84 deform sufficiently to permit the arm 78 to seat in a receptive opening 86 in the clip. A curved upper surface 88 on the clip 76 slides guidingly between spaced skirt edges 90, 92 at the bottom of the skirt slot 64. The pin 50 can be disassembled by drawing the retainer clip 76 off of the operating arm 78 from the rear of the spool 32.

A coil spring 94 surrounds the pin body 52 and bears between a rearwardly facing surface 96 on the rear spool flange 48 and an axially forwardly facing surface 98 on the operating arm 78. In the operative position for the pin shown in FIG. 3, the coil spring 94 is compressed, so that it urges the pin 50 normally rearwardly towards the retracted position of FIG. 2. In order to maintain the pin 50 in the FIG. 3 position, a notch 100 is formed in the pin 50. The notch 100 is dimensioned lengthwise of the pin 50 to relatively closely seat the wall of rear flange 48.

The coil spring 94 is also responsible for urging the pin 50 radially inwardly so that the flange 48 seats in the notch 100. The coil spring 94 has a free arm 102 which is bent radially inwardly around one lug 104, extending rearwardly from the flange 48, and radially outwardly of a second lug 106, also on the flange 48. The forming of the arm 102 around the lugs 104, 106 loads the spring arm 102 so that a force directed principally radially inwardly is exerted on the pin body 52 thereby urging the pin 50 into the FIG. 3 operative position. The coil spring 94 thus serves the dual purposes of normally maintaining the pin 50 in its retracted position in FIG. 2 by exertion of a force due to its compression and also urging the pin radially inwardly by exertion of a torque on the pin 50 through the arm 102.

With the pin 50 in place, the operating arm 78 projects radially through the slot 64 in the skirt 62. The arm 78 has an enlarged head 108 which facilitates placement of a user's finger so that the pin 50 can be readily shifted in a fore and aft direction. The combined extension of the operating arm 78 and associated head 108 radially outwardly of the slot 64 is less than the spacing of the outer surface 110 of the skirt 62 from that portion of the bail ears 24 that rotates directly over the operating arm 78 and head 108. The arm 70 will thus not interfere with the normal operation of the bail assembly 22 and will be readily accessible at all times that it resides between the bail ears 24.

Overall, the structure is simple from a manufacturing standpoint, yet very effective in operation. The spool assembly 12 can be assembled in the same fashion that a conventional spool is assembled to a reel.

It should be understood that the foregoing detailed description is made for purposes of illustrating the structure and operation of a preferred embodiment of the invention, and no unnecessary limitations should be understood therefrom.

I claim:

1. A line-carrying spool assembly for a fishing reel having an axially spaced front and rear, a housing and a bail assembly having first and second bail ears and first and second bail arms carrying a bail and movably mounted to the bail ears, said line-carrying spool assembly comprising:

a spool having (a) a hub with a central axis and an annular surface around which line can be wound; and (b) first and second flanges spaced axially in a fore and aft direction with respect to said hub and extending radially outwardly from said annular hub surface, said first and second flanges and annular hub surface cooperatively bounding a line storage space, there further being an annular skirt extending axially rearwardly from one of said first and second flanges;

first means for mounting the bail assembly to the housing for rotation relative to the housing so that the bail assembly directs line on to the spool as the bail assembly is rotated;

a line depth setting pin having an elongate body and an operating arm to manually effect movement of said line depth setting pin;

second means for mounting the line depth setting pin to the spool for movement relative to the spool between (a) an operative position wherein the line depth setting pin extends through said line storage space between the first and second flanges radially outwardly of the annular hub surface and (b) a retracted position wherein substantially the entire line depth setting pin resides outside of the spool storage space, said second mounting means including a bore through one of said first and second flanges within which said line depth setting pin is guided axially with respect to the spool between said operative and retracted positions, said second mounting means including means on said skirt in addition to said bore for guiding axial movement of said line depth setting pin between said operative and retracted positions, said operating arm on the line depth setting pin axially coinciding with the bail ears and residing radially inside of said bail ears; and means for selectively maintaining the line depth setting pin in each of the operative and retracted positions, said line depth setting pin in said operative position blocking the paying out of line wrapped on the spool hub and positioned so that line being retrieved on the spool wraps around the line depth setting pin, said pin in said operative position being axially forwardly of the pin in said retracted position.

2. The line-carrying spool assembly according to claim 1 wherein the means for maintaining the line depth setting pin in the operative position comprises an axially facing surface on one of the flanges, an axially facing shoulder on the line depth setting pin and means for urging the pin radially inwardly with the line depth setting pin in its operative position to bring the shoulder on the line depth setting pin into axially facing abutting relationship with the surface on the one flange.

3. The line-carrying spool assembly according to claim 2 wherein said means for urging the line depth setting pin radially inwardly comprises a coil spring surrounding the line depth setting pin.

4. The line-carrying spool assembly according to claim 2 wherein said urging means comprises means for simultaneously urging the line depth setting pin towards its retracted position.

5. The line-carrying spool assembly according to claim 1 wherein means are provided for normally biasing the line depth setting pin towards its retracted position.

6. The line-carrying spool assembly according to claim 2 wherein there is a notch in said line depth setting pin defining said axially facing shoulder and a portion of the one flange nests in said notch with the line depth setting in the operative position to limit shifting of the line depth setting pin in axially opposite directions relative to the spool.

7. (rewritten in independent form) A line-carrying spool assembly for a fishing reel having an axially spaced front and rear, said line-carrying spool assembly comprising:

a spool having (a) a hub having a central axis and an annular surface around which line can be wound; and (b) first and second flanges spaced axially with respect to said hub and extending radially outwardly from said annular hub surface, said first and second flanges and annular hub surface cooperatively bounding a line storage space, there further being an annular skirt integral with and extending axially rearwardly from said second flange and an elongate slot extending radially through said skirt and having its length aligned in a fore and aft direction;

a line depth setting pin having an elongate body and an operating arm extending from said body through the elongate skirt slot so as to be guided therein in a fore and aft direction;

a through bore in said second flange to guide axial movement of said line depth setting pin relative to the spool between (a) an operative position wherein the line depth setting pin extends through said line storage space between the first and second flanges radially outwardly of the annular hub surface and (b) a retracted position wherein substantially the entire line depth setting pin resides outside of the spool storage space; and cooperating means on the elongate pin body and spool for selectively maintaining the line depth setting pin in each of the operative and retracted positions, said line depth setting pin in said operative position blocking the paying out of line wrapped on the spool hub and positioned so that line being retrieved on the spool wraps around the line depth setting pin, wherein the skirt slot is completely surrounded by the skirt and said line depth setting pin has a ramp surface defining a wedge shape at its forward portion to facilitate passage through the skirt slot and through bore and into assembled position.

8. The line-carrying spool assembly according to claim 7 wherein said means for maintaining the line depth setting pin in the operative position comprises a notch in the body of the line depth setting pin defining an axially facing shoulder, an axially facing surface on the second flange and spring menas for urging the line depth setting pin radially inwardly so that a portion of the second flange moves into the notch.

9. The line-carrying spool assembly according to claim 7 wherein said line depth setting pin and operating arm are integrally formed as a single piece and said means for maintaining the line depth setting pin in its retracted position comprises a coil spring surrounding the body of the line depth setting pin and compressed between the second flange and the operating arm on the line depth setting pin.

10. The line-carrying spool assembly according to claim 7, wherein there is an annular skirt on the spool, means are provided for removably mounting the line depth setting pin in the elongate skirt slot and said means for removably mounting the line depth setting pin in the elongate slot comprises a retainer clip, cooperating means on the retainer clip and line depth setting pin for removably maintaining the retainer clip on the line depth setting pin and cooperating means on the retainer clip and skirt for guiding axial movement of the line depth setting pin relative to the spool and for limiting movement of the line depth setting pin radially outwardly of the spool.

11. The line-carrying spool assembly according to claim 7 including means for normally biasing the depth setting pin in its retracted position.

12. A line-carrying spool assembly for a fishing reel, said line-carrying spool assembly comprising:
   a spool having
   (a) a hub with a central axis and an annular surface around which line can be wound; and
   (b) first and second flanges spaced axially with respect to said hub and extending radially outwardly from said annular hub surface,
   said first and second flanges and annular hub surface cooperatively bounding a line storage space;
a line depth setting pin with an elongate body with a forward free end;
means for mounting the line depth setting pin to the spool for movement relative to the spool between (a) an operative position wherein the line depth setting pin extends through said line storage space between the first and second flanges radially outwardly of the annular hub surface and (b) a retracted position wherein substantially the entire line depth setting pin resides outside of the spool storage space,
said mounting means including a bore extending axially through one of said first and second flanges for slidably receiving said elongate pin body,
said free pin end being wedge-shaped to facilitate introduction of said pin body into said bore in the flange; and
means for selectively maintaining the line depth setting pin in each of the operative and retracted positions,
said line depth setting pin in said operative position blocking the paying out of line wrapped on the spool hub and positioned so that line being retrieved on the spool wraps around the line depth setting pin.

* * * * *